(12) United States Patent
Lau et al.

(10) Patent No.: US 10,094,555 B2
(45) Date of Patent: *Oct. 9, 2018

(54) TREATMENT DEVICE OF A HEATING SYSTEM

(71) Applicant: ProGreen Labs, LLC, Alexandria, VA (US)

(72) Inventors: James Hua Lau, Springfield, VA (US); Luis M Murillo, Monroe, CT (US)

(73) Assignee: ProGreen Labs, LLC, Fairfax, VA (US)

( * ) Notice: Subject to any disclaimer, the term of this patent is extended or adjusted under 35 U.S.C. 154(b) by 160 days.

This patent is subject to a terminal disclaimer.

(21) Appl. No.: 15/282,299

(22) Filed: Sep. 30, 2016

(65) Prior Publication Data

US 2017/0030579 A1    Feb. 2, 2017

Related U.S. Application Data

(63) Continuation of application No. 14/198,720, filed on Mar. 6, 2014, now Pat. No. 9,488,373.

(51) Int. Cl.
*F23C 99/00* (2006.01)
*F23K 5/14* (2006.01)
(Continued)

(52) U.S. Cl.
CPC .............. *F23C 99/001* (2013.01); *F23K 5/04* (2013.01); *F23K 5/08* (2013.01); *F23K 5/14* (2013.01);
(Continued)

(58) Field of Classification Search
CPC ... F23K 5/147; F23K 5/04; F23K 5/20; F23K 5/08; F23K 2301/101; F23N 1/08;
(Continued)

(56) References Cited

U.S. PATENT DOCUMENTS 1,332,667 A    3/1920   Irish
1,398,650 A   11/1921   Rothwell
(Continued)

FOREIGN PATENT DOCUMENTS

GB         2020795      11/1979
JP         02071008      3/1990
(Continued)

*Primary Examiner* — Alfred Basichas
(74) *Attorney, Agent, or Firm* — Lau & Associates, LLC

(57) ABSTRACT

The present invention materially enhances the quality of the environment and mankind by contributing to the restoration or maintenance of the basic life-sustaining natural elements. The present invention reduces the amount of carbon monoxide introduced to the atmosphere of a combustion system. This is achieved by furnishing a systems approach to optimize the amount of oxygen to be chemically combined with fuel upon ignition of both allowing the correct amount of carbon to combine with the correct amount of oxygen thus fully release the thermal energy stored therein. By so furnishing the level of oxygen with carbon of the fuel, more carbon dioxide is produced thus proportionally reduces the amount of carbon monoxide released to the atmosphere. The present invention provides a heating system that surpasses the net and gross efficiency performance of a natural gas burner.

20 Claims, 7 Drawing Sheets

(51) Int. Cl.
*F23K 5/04* (2006.01)
*F23K 5/08* (2006.01)
*F23K 5/20* (2006.01)
*F23N 1/08* (2006.01)

(52) U.S. Cl.
CPC ............ *F23K 5/147* (2013.01); *F23K 5/20* (2013.01); *F23N 1/08* (2013.01); *F23K 2301/101* (2013.01); *Y02E 20/328* (2013.01); *Y10T 137/86187* (2015.04)

(58) Field of Classification Search
CPC ........... Y10T 137/86187; Y02E 20/328; F23D 11/443; F23D 11/24
See application file for complete search history.

(56) References Cited

U.S. PATENT DOCUMENTS

| | | | |
|---|---|---|---|
| 1,587,263 A | 6/1926 | Willners |
| 1,641,017 A | 8/1927 | Staples |
| 1,713,357 A | 5/1929 | St Clair |
| 1,725,381 A | 8/1929 | Thomas |
| 1,767,462 A | 6/1930 | Lammert |
| 1,882,241 A | 10/1932 | Curran |
| 2,068,593 A | 1/1937 | Bork |
| 2,233,770 A | 3/1941 | Campbell |
| 2,247,781 A | 7/1941 | Leiman |
| 2,351,697 A | 6/1944 | Nielsen |
| 2,532,851 A | 12/1950 | Meyer |
| 2,580,113 A | 12/1951 | Martiri |
| 2,626,187 A | 1/1953 | Toftmann |
| 2,928,612 A | 3/1960 | Maccracken |
| 3,446,440 A | 5/1969 | Pelz, Jr. |
| 3,451,626 A | 6/1969 | Roosa |
| 3,921,390 A | 11/1975 | Stoltman |
| 4,436,506 A | 3/1984 | Berkhof |
| 4,480,172 A | 10/1984 | Cicllot et al. |
| 4,516,151 A | 5/1985 | Stahler |
| 5,249,552 A | 10/1993 | Brooks |
| 5,944,510 A | 8/1999 | Greiner |
| 6,851,413 B1 | 2/2005 | Tamol, Sr. |
| 8,414,661 B2 | 4/2013 | Kramer et al. |
| 9,488,373 B2 * | 11/2016 | Lau .................... F23K 5/147 |
| 9,593,857 B2 | 3/2017 | Lau et al. |
| 9,638,413 B2 * | 5/2017 | Lau .................... F23D 11/443 |
| 2004/0000595 A1 | 1/2004 | Munzner et al. |
| 2005/0016507 A1 | 1/2005 | Tamol, Sr. |
| 2007/0051347 A1 | 3/2007 | Thalberg |
| 2010/0062384 A1 | 3/2010 | LaVoie |
| 2010/0071369 A1 | 3/2010 | Martin |
| 2011/0174264 A1 | 7/2011 | Crawley, II et al. |
| 2012/0030993 A1 | 2/2012 | Crosier et al. |
| 2015/0247638 A1 | 9/2015 | Soppa |
| 2015/0253004 A1 | 9/2015 | Lau et al. |
| 2015/0253017 A1 | 9/2015 | Lau et al. |
| 2017/0176021 A1 | 6/2017 | Lau et al. |

FOREIGN PATENT DOCUMENTS

| | | |
|---|---|---|
| JP | 2008121442 A | 5/2008 |
| RU | 02246661 | 2/2005 |
| RU | 002340835 | 12/2008 |
| WO | WO 99/11977 | 3/1999 |
| WO | WO2006/029203 | 3/2006 |
| WO | WO2015134681 | 9/2015 |
| WO | WO2015134799 | 9/2015 |
| WO | WO2015134806 | 9/2015 |

* cited by examiner

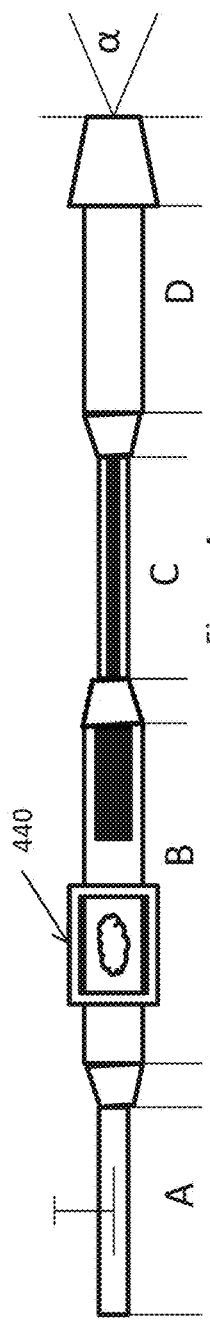
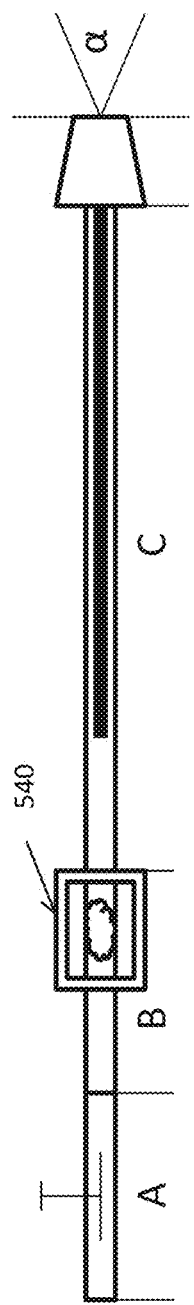
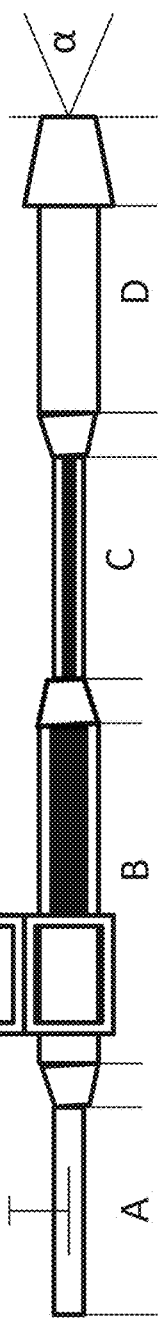
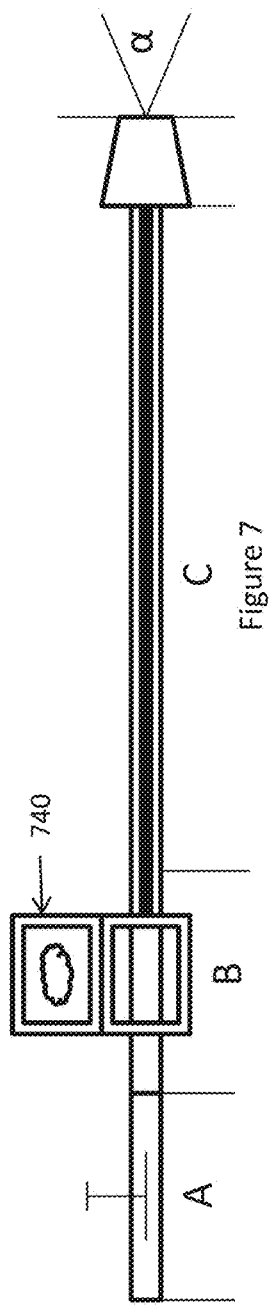

| Test | Equipment | Fuel Type | CO2 % | O2 % | CO PPM | CO2 Max % | Fluegas Temp °F | Excess Air % | Undiluted CO PPM | Net Efficiency % | Gross Efficiency % |
|---|---|---|---|---|---|---|---|---|---|---|---|
| A | Present Invention | #2 Diesel | 9.6 | 8.0 | 0 | 15.5 | 459.3 | 61.5 | 0 | 86.7 | 81.6 |
| B | Conventional Equipment | #2 Diesel | 7.6 | 10.7 | 51 | 15.5 | 651.9 | 103.8 | 104 | 75.5 | 71.0 |
| C | Conventional Equipment | Natural gas | 4.3 | 13.4 | 10 | 11.9 | 279.3 | 176.3 | 27 | 86.6 | 78.5 |
| D | Conventional Equipment | Natural Gas | 4.1 | 13.7 | 3 | 11.9 | 367.5 | 187.6 | 10 | 81.0 | 73.6 |

Figure 11

TREATMENT DEVICE OF A HEATING SYSTEM

This is a continuation application of parent patent application Ser. No. 14/198,720 filed on Mar. 6, 2014, now allowed.

BACKGROUND OF THE INVENTION

Carbon-based air pollution has been a perpetual environmental problem ever since the dawn of the industrial revolution. Air pollution comes from many different sources such as factories, power plants, home heating, among others. Damages due to pollution include depletion of the ozone layer, global warming, erratic temperature shifts throughout the world, prolong period of droughts and floods, melting of glaciers, rising of the sea level, record numbers of typhoons, tornados, thunderstorms, and global experience of the el Nino effects. Scientists disagree as to the cause of these global weather changes as there are simply too many complicating factors. However, through decades of collective and elaborative cross-discipline scientific studies and discussions, there appears to be a consensus that the mass introduction of carbon into the atmosphere is one of the key factors contributing to the above-mentioned environmental problems. Heating systems in burning solid, liquid and vapor fuels used commercially and residentially are some of the many ways carbon is introduced into the atmosphere. There is a recent movement of advocating renewable energies such as solar, hydro-electric, wind, and nuclear as viable alternatives to minimize the introduction of carbon into the atmosphere. While these alternatives are indeed contributing to environmental quality as a whole, the predominant energy sources still come from the burning of solid, liquid and vapor fuels. The present invention makes improvements by rendering a more efficient combustion of the traditional sources of energy which in turn lowers consumption of combustible energies and thus reduces emission of carbon into the atmosphere.

SUMMARY OF THE INVENTION

Industrial and residential combustion-based heating systems place special emphasis on the atomization of fuel immediately prior to combustion. They also control the demand of heat to reduce consumption and wastage of fuels. Few emphases are placed on fuel preparation prior to the final atomization. While there are innovative individuals like LaVoie (U.S. Pat. No. 8,052,418) who advocates pre-heating fuels and altering pressurization of fuels prior to the final stage of atomization, these approaches are generally effective and combustion efficiency can indeed be gained but that gain is offset by energies necessarily consumed to preheat the fuel and to increase pressurization of the fuel. Because the energy consumed is in a different form; namely, electricity, that energy consumption is left out of the calculation of the total amount of energy saved. Considering the net energy consumed and saved, the saving being realized is not as stellar as it first appears.

BRIEF DESCRIPTION OF THE DRAWING

FIG. 4 is a diagrammatic view of a multi-stage pre-nozzle fuel treatment device with a direct fuel preheat device of the present invention.

FIG. 5 is a diagrammatic view of a single stage pre-nozzle fuel treatment device with a direct fuel preheat device of the present invention.

FIG. 6 is a diagrammatic view of a multi-stage pre-nozzle fuel treatment device with an in-direct fuel pre-heat device of the present invention.

FIG. 7 is a diagrammatic view of a single stage pre-nozzle fuel treatment device with an in-direct fuel preheat device of the present invention.

FIG. 11 is a table comparing combustion results of conventional technology with the present invention.

DETAIL DESCRIPTION OF THE INVENTION

Figure 1:
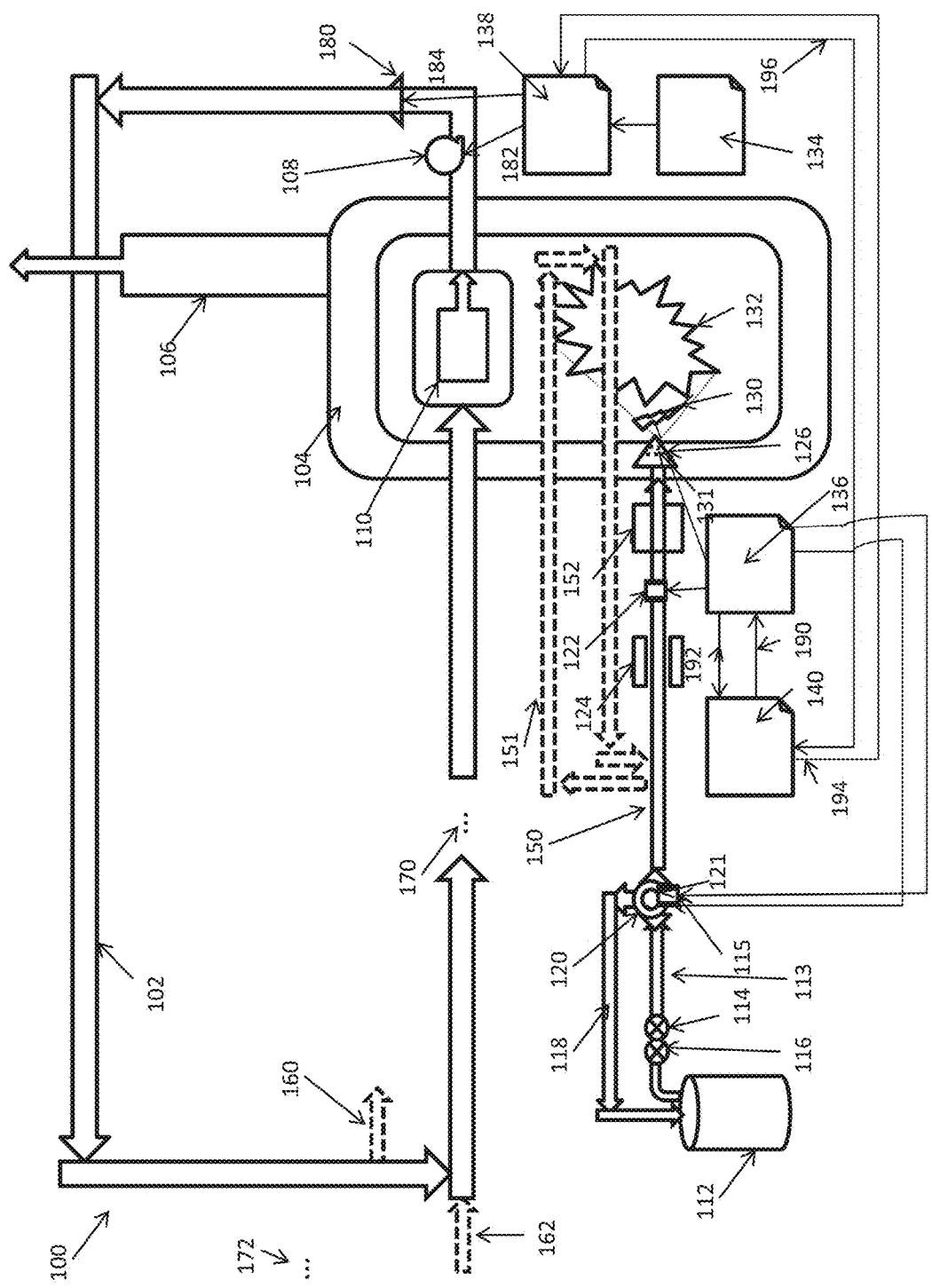
FIG. 1 is a systematic view of the heating system of the present invention.

FIG. 1 is a systematic view of the heating system of the present invention. The heating system 100 utilizes a heat exchange system 102. Heat exchange system 102 is a representation of various types of systems. One example is a liquid heat exchange system whereby a heat exchange medium is circulated by a circulating pump 108 in an enclosed ambient environment or in a non-enclosed environment but heat permeated there-from the exchange system 102 could provide heat to people or livestock, or anything that could be of benefit to receive heat. The heat exchange medium could be one of oil, steam, water, coolants or any other types. The exchange system 102 could contain any number of zones, subzones or sub-systems. For example, there could be a number of series zones 170 and parallel zones 172 whereby each zone has a uniquely different heat requirement such as a sauna room, a classroom, a cafeteria, an auditorium, a shower room, an office, a greenhouse, a patio, an outdoor field, a steam room, a steam heating system, a water heating system, a heated pool, a water tank system, a laundry system, etc. Each of the zones and each of the systems may have a different temperature requirement than any other. On the other hand, some zones and systems may share same or similar heating requirements. By way of an example, heat circulating in heat exchange system 102 is generated by a furnace 104 housing therein a heating element 110 containing the liquid serving as a heat exchange medium. The heat exchange medium circulates within the heat exchange system 102 leaving the heating element 110 at the highest temperature and returns to the heating element 110 at the lowest temperature. The heating system 102 could be one of an open system, a closed system or a combination thereof. Example of an open system could be a water tank supplying hot water to a swimming pool, a shower room, a cafeteria kitchen, a laundry room, a household or any other situation where heated liquid is consumed and not return to the heat exchange system 102 representatively shown as consumption outlet 160. As liquid is diverted from the heat exchange system 102, replenishment is supplied by a liquid source representatively shown as supply inlet 162.

Figure 9:
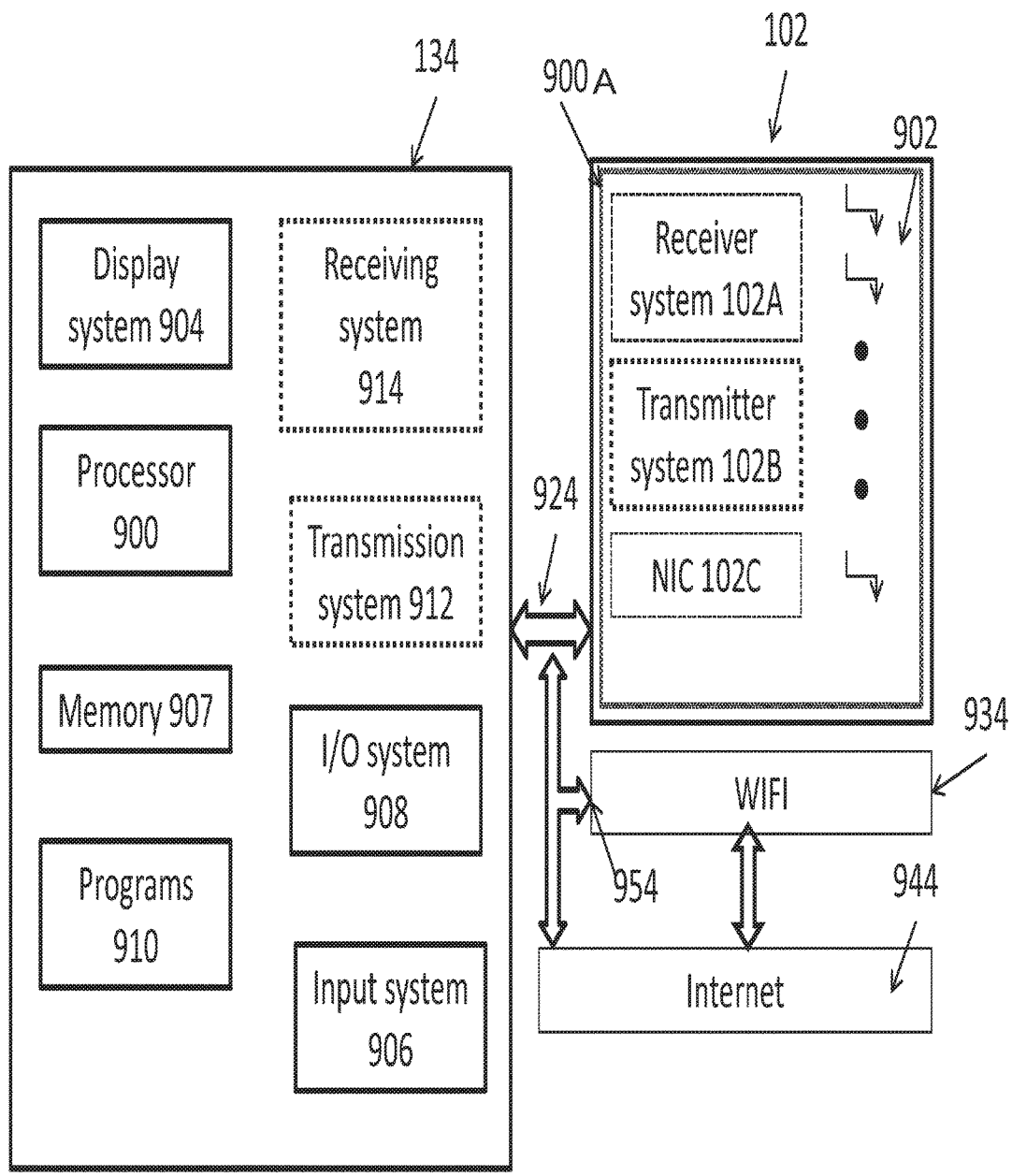
FIG. 9 is a diagrammatic view of the temperature controller and thermostat.

Each of many zones or many sub-systems of the heat exchange system 102 may set its heating requirement by a temperature controller 134. Working together with the temperature controller 134 is a thermostat detecting and reporting system 900A including a set of thermometers 902 as shown by way of an example in FIG. 9. An end user may set desirable temperature requirements via input system 906. The end user's temperature requirements may be specified based on different time blocks, zones and/or sub-systems 170-172. Because multiple zones and/or sub-systems 170-172 are accommodated, a thermometer 902 needs to be installed at each of zones and sub-system 170-172. In a residential home with two floor levels plus a basement with a water heater for example, due to the natural property of rising heat, temperature setting on the first level let's say zone 1 needs to be at 70° F. to be comfortable due to naturally cold ground level, temperature setting of the second level let's say zone 2 needs to be at 68° F. to be comfortable because natural rising of the heat from zone 1 would bring up the temperature in zone 2 close to 70° F. over time, and the temperature setting of the top floor let's say zone 3 needs to be at 66° F. as natural rising of the heat from zones 1-2 would bring the temperature of zone 3 close to 70° F. overtime. In terms of the water heater, which let's call sub-system 1, would have a much higher temperature let's say 140° F. As a thermometer 902 is installed at each of zones 1, 2, 3 and sub-system 1, temperature controller 134 would notice whether heating requirements at each individual zones and sub-system is met. Temperature requirements from zones 1, 2, 3 and the sub-system 1 are stored in memory 907. As temperature requirements of zones 1, 2, 3 and sub-system 1 are entered and implemented by a computer program 910, display system 904 provides feedback as to what the end-user specified. Of course, at the conclusion of specifying all temperature requirements, the end-user may utilize the input system 906 to confirm or correct via display system 904 all temperature requirements. Given each of the thermometers 902 could communicate its information to the temperature controller 134 by an interface system 924 or receiving system 914 wirelessly via transmission system 912 and receiver system 102A and transmitter system 102B. If via the interface system 924, then information is communicated to the processor 900 via an input/output system 908. If via the transmitter system 102B, then information is communicated to the processor 900 via input/output system 908 by way of receiving system 914.

In industrial applications where computer control via a local area network 954 being so popular, a network interface card 102C or either wired or wireless type can be installed to receive signals and request confirmations there-through. With remote industrial operations where master control is far away, the Internet 944 can be relied upon to receive signals and request confirmations.

With the popularity of the Internet 944 and wireless fidelity technology commonly known as WIFI 934, all communications whether from end-user to device or from device to device can be done remotely. An example of from an end-user to a device could be the end user in the comfort of one's bedroom changing temperature requirement settings without having to travel to where the temperature controller 134 is located. If proper software is installed in one's smart phone, tablet, laptop or desktop computer, then the end user is at liberty to make changes at times and locations to his or her convenience. If the end user is at home, then changes can be made via WIFI 934. If the end user is at a remote location such as at work, on business trip, vacation, etc., then the end user may make changes via Internet 944, WIFI 934, local network 954, either singly or in combination depending on appropriate technology capabilities.

Figure 10:
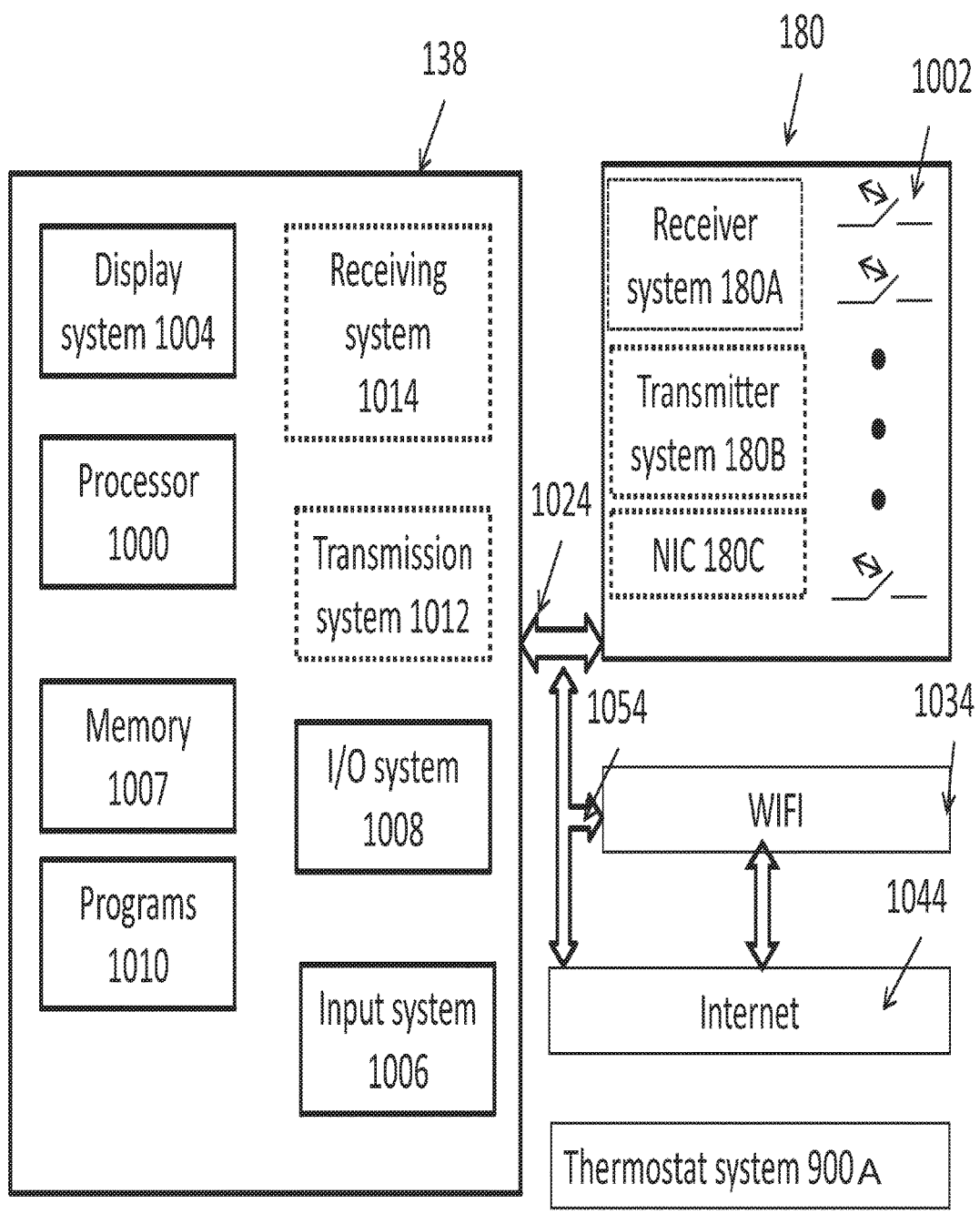
FIG. 10 is a diagrammatic view of the service demand controller.

The temperature controller 134 provides information to the service demand controller 138 as shown by way of an example in FIG. 10. The service demand controller 138 includes a number of devices to control the operation of a switching system 180 via connection 184 shown by way of an example in FIG. 1. As explained earlier that there are any number of zones and/or sub-systems 170 and 172 connected in series and/or in parallel with the heat exchange system 102, this means each zone or sub-system necessarily requires a dedicated switching system 180. The purpose of the switching system 180 is to permit or prevent heat exchange medium from entering into the heating exchange system 102 of the appropriate zone or sub-system 170-172. For example, if a zone's or sub-system's temperature requirement as entered into the temperature control 134 is not met, then switch 1002 of the switching system is opened to permit heat exchange communication. Conversely, switch 1002 is closed to prevent heat exchange communication should the temperature requirement be met.

Every switching device 1002 of the switching system is electro-mechanical in nature whereby switching action is motivated by an electrical driver and an electrical motor. Though the electrical driver, the electrical motor and power source are not shown, a person of ordinary skill in the art fully understands the mechanism needed to implement the switching functions. Upon receipt of instructions from the service demand controller 138, the electrical driver would cause the electric motor to implement received instructions. Instructions could arrive via a wired interface 1024, or via wireless signals emitted directly from the service demand controller 138 through a transmission system 1012. A wired interface is preferred because it has proven to be reliable. However, in industrial applications or peculiar situations where installing physical wire may not be technically or economically feasible, wireless signals are possible. One wireless communication possibility is to rely upon the installation of a transmission system 1012 and a receiving system 1014 of the service demand controller 138, and the receiver system 180A and transmitter system 180B of the switching system 180 or network interface card 180C. To prevent signal interference or strayed incidental signal in the same frequency unintentionally activate any switching actions, the transmitter system 180B can be used to request either confirmation or a second signal of a same or different type to activate any switching actions.

In industrial applications where computer control via a local area network 1054 being so popular, a network interface card 180C or either wired or wireless type can be installed to receive signals and request confirmations there-through. With remote industrial operations where master control is far away, the Internet 1044 can be relied upon to receive signals and request confirmations.

In typical residential applications, for example, the service demand system 138 could be a simple printed circuit board with simple relays and drivers, such as switching relay. However, in industrial applications where a series of switching actions among multiple zones or multiple sub-systems are needed to achieve a desired result, a programmable controlled service demand controller 138 run by a computer program 1010 is needed, whereby an input system 1006 is used to input setting requirements, a display system 1004 is needed to verify input information, a memory 1007 is needed to retain the input information, a program 1010 is needed to record algorithms to be executed in view of the input information, a processor 1000 is needed to implement the algorithms, and an input/output system 1008 is needed to interactively or unilaterally communicate with other systems.

Interactively connected to the service demand controller 138 is an environment exchange controller 140, as shown in FIG. 1. The purpose of the environment exchange controller 140 is to set temperature requirements of the heat exchange medium be it water, oil, coolant or steam. There are an upper temperature limit and a lower temperature limit. Associated with the upper temperature limit is an upper deviation limit. Similarly, associated with the lower temperature limit is a lower deviation limit. The purpose of each of these limits can be easily understood by an example. A residential user may set the upper temperature limit to 180° F., the upper deviation limit to 10° F., the lower temperature limit to 160° F., and the lower deviation limit to 15° F.

In winter months, whenever the temperature of the heat exchange medium falls 10° F. from 180° F., the environmental exchange controller 140 activates the fuel supply pump 120 supplying fuel to the furnace 104. Concurrently, a signal 194 informs the service demand controller 138 to activate pump 108 via line 182 to circulate the heat exchange medium within the environmental heating exchange 102. The combustion controller 136 activates an igniter 130 near or in the spray path of nozzle 126. An optical sensor under the control of the combustion controller 136 independently verifies the igniter 130 is indeed on. Once verified, sign 192 informs the environmental exchange controller 140 to activate the pump 120 build therewith a user sellable pressure regulator 121, for example. If there is not a build-in solenoid in the pump, then a solenoid can be installed immediately downstream from the pump 120. Pump 120 would transport heating fuel from tank 112 via one of more filters 114 and 116 along fuel line 113 to remove particular materials. Upstream of pump 120 is a shutoff solenoid 115 and downstream of pump 120 is another shutoff solenoid 122. Both solenoids could be controlled by the combustion controller 136. Both solenoids are of course open when heater fuel is demanded so as to allow fuels to flow. However, as soon as the demand stops, both solenoids 115 and 122 are shut off to prevent fuel in the fuel line under pressure from being forced into flame 132 due to build-up pressures of the pump 120. Pump 120 contains a bypass path 118 for the fuel to escape back to tank 112. Solenoid 115 could be either downstream of pump 120 or be integrated therein pump 120. Pump 120 can be preset to operate with a predetermined pressure anywhere from 0 to 600 PSI. Fuel in passage 150 is transported to pass through a set of magnets 124 to ionize and align orientation of elements in the fuel. Magnet 124 could be of the permanent type. Alternatively, magnet 124 could be an electromagnet connected to battery or AC sources. The set of magnets could be arranged in repulsive mode in either a south-south arrangement or a north-north arrangement. Shown in dash line is a passage 151 to preheat the fuel prior to combustion to be discussed in greater detail later.

When the pump 120 is in operation, a signal 190 is also sent from the environmental exchange controller 140 to the combustion controller 136 to activate an air supply device 152 injecting ambient air into the furnace 104. As both ambient air from air supply device 152 and fuel from nozzle 126 flow pass the igniter 130, a flame 132 is started to release heat energies. As a safety precaution, before fuel is ejected from nozzle 126, an optical device 131 checks and verifies whether igniter 130 produces a glowing heat. If yes, then pump 120 turns on by the combustion controller 136 to eject fuel from nozzle 126 and be set aflame by the glowing heat. If no, then pump 120 would not be turned on by the combustion controller 136 to eject any fuel to prevent any potential hazards.

Exhaust gas of flame 132 is vented to the atmosphere via outlet 106. The flame 132 is used to introduce heat energies to the heating element 110 which houses the heat exchange medium. As the heat exchange medium circulates in the environmental heating exchange 102, the associated zone or sub-system 170-172 are heated. Once the heat exchange medium reaches the upper temperature limit of 180° F., the environmental exchange controller 140 deactivates the fuel supply pump 120 and sends a signal 190 to the combustion controller 136 to deactivate the igniter 130 as well as the air supply device 152. Due to a lack of influx fuel and air, the flame 132 disappears and no more heat energies are released to the heating element 110. Temperature of the heat exchange medium will continue to increase beyond the upper temperature limit as heat energies stored in the heating element 110 and furnace 104 continue to transfer remaining heat to the heat exchange medium. Once temperature of the heat exchange medium reaches a peak, it will drop as it transfers heat energies to the environmental heating exchange 102. When the temperature drops 10 degrees below the upper temperature limit of 180° F., the cycle of initiating flame repeats again.

The lower temperature limit is especially useful in warm weathers such as summer, fall and spring seasons. Following the previously introduced example, whenever the temperature of the heat exchange medium drops 15° F. below the 160° F., the environmental exchange controller 140 activates the fuel supply pump 120 supplying fuel to the furnace 104. Concurrently, a signal 194 informs the service demand controller 138 to activate circulating pump 108 to circulate the heat exchange medium within the heat exchange system 102. The combustion controller 136 activates an igniter 130 near or in the spray path of nozzle 126. An optical sensor 131 under the control of the combustion controller 136 independently verifies the igniter 130 is indeed on. Once verified, signal 192 informs the environmental exchange controller 140 to activate the pump 120 build therewith a user sellable pressure regulator 121. A signal 190 is also sent from the environmental exchange controller 140 to the combustion controller 136 to activate an air supply device 152 injecting ambient air into the furnace 104. As both ambient air from air supply device 152 and fuel from nozzle 126 flow pass the igniter 130, a flame 132 is ignited to release heat energies. The flame 132 is used to release heat energies to the heating element 110 which houses the heat exchange medium. As the heat exchange medium circulates in the heat exchange system 102, the associated zone and/or sub-system 170-172 are heated. Once the heat exchange medium reaches the lower temperature limit of 160 degrees, the environmental exchange controller 140 deactivates the fuel supply pump 120 and sends a signal 190 to the combustion controller 136 to deactivate the igniter 130 as well as the air supply device 152. Due to a lack of an influx of fuel and air, the flame 132 disappears and no more heat energies are released to the heating element 110. Temperature of the heat exchange medium will continue to increase beyond the lower temperature limit as heat energies stored in the heating element 110 and furnace 104 continue to be transferred to the heat exchange medium. Once temperature of the heat exchange medium reaches a peak, it will drop as it transfers heat energies to the environmental heating exchange 102. When the temperature drops 15° F. below the lower temperature limit of 160° F., the cycle of heating the heat exchange medium is repeated.

Figure 2:
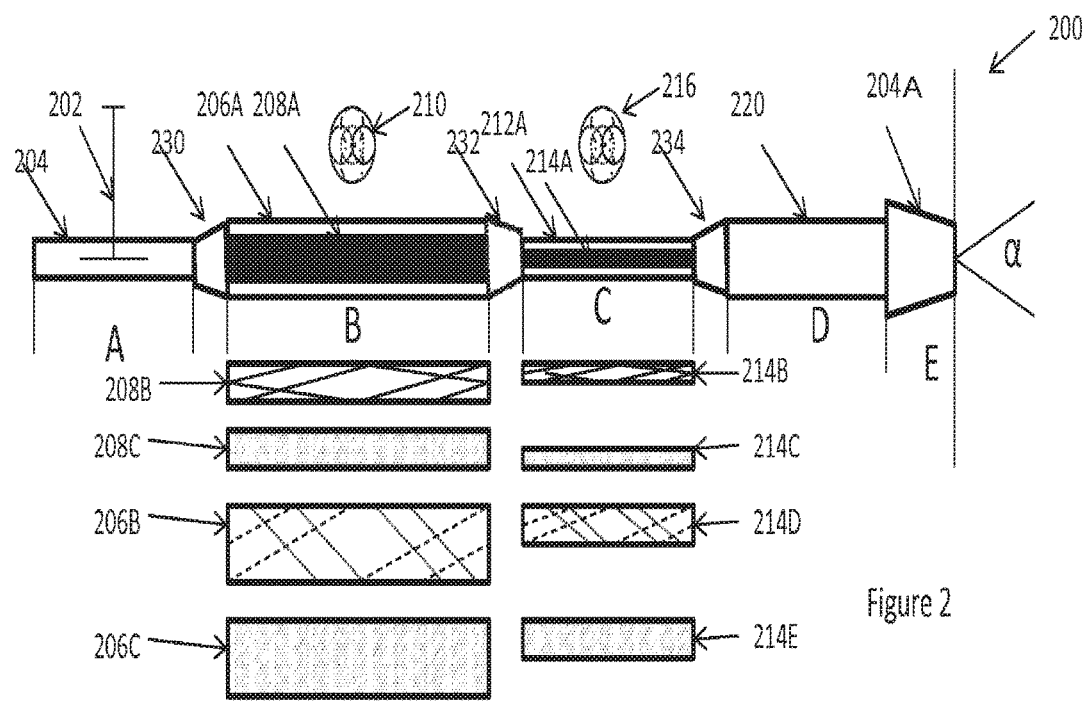
FIG. 2 is a diagrammatic view of a multi-stage pre-nozzle fuel treatment device of the present invention.

FIG. 2 shows a multi-stage pre-nozzle device 200 with stages A, B, C, D and E, which is generally shown as passage 150 in FIG. 1. Stage A show a first fuel passage 204 with a device pressure regulator 202. Pressure setting of the pressure regulator 202 could vary between 0-200 PSI, inclusive of each and every number within the range, depending upon application need and calibration requirements.

Stage B is a second fuel passage 206A with an internal treatment rod 208A. Rod 208A is a smooth surface rod. In alternative embodiments of rod 208A, a rod with a spiral track in either clockwise, counterclockwise or a combination of clockwise and counterclockwise directions as shown in 208B and a rod with rough textured surface as shown in 208C are possible. The treatment rod has a surface graded in a range from 10 to 12000 grids in roughness inclusive of each and every number within the range. Rod 208A is situated inside the second fuel passage line 206A free of any supports. If a cross-sectional view is taken, the arrangement between 208A and 206A could look like 210, whereby rod 208A, 206B or 208C could be in the center, leaning against any inner side surface of the second fuel passage line 206A.

In alternative embodiments, second fuel passage 206B has an interior track spiraling either clockwise or counterclockwise in direction as shown with the dash-lines. Alternatively, second fuel passage 206C could have interior rough surfaces graded in a range from 10 to 12000 grids in roughness inclusive of each and every number in the range.

Stage C is a third fuel passage 212A with an internal treatment rod 214A. Rod 214A is a smooth surface rod. In alternative embodiments of rod 214A, a rod with a spiral track in either clockwise or counterclockwise directions as shown in 214B and a rod with rough textured surface as shown in 214C are possible. The second fuel passage line 206A and third fuel passage line 212A have smooth interior surfaces. However, either one or both may also contain an interior spiral track as that of 214B in either clockwise, counterclockwise and a combination of clockwise and counterclockwise directions or with an interior textured surface as that of 214C.

Rod 214A is situated inside the third fuel passage 212A free of any supports other than surface tension. If a cross-sectional view is taken, the arrangement between 214A and 212A could look like 216, whereby rod 214A, 214B or 214C could be in the center, leaning against any interior side surface of the third fuel passage line 212 A. Alternatively, fuel treatment passage 214D with interior tracks spiraling in clockwise or counter-clockwise directions as shown in dash-lines may be used. Fuel treatment passage 214E with interior rough surfaces graded in a range from 10 to 12000 grids of roughness, inclusive of each and every number in the range, may also be used.

Stage D is a fourth fuel passage 220 and stage E is a nozzle 204A. Nozzle 204A has a spray coverage angle α ranging anywhere between 5° to 175°, inclusive of each and every angle in the range. Atomized spray pattern can cover the entire interior volume of the spray coverage angle α, partial interior volume of the spray coverage angle α, or leave the innermost interior volume of the spray coverage angle α void. Reference 230, 232 and 234 are connectors connecting the numerous fuel passages.

Figure 3:
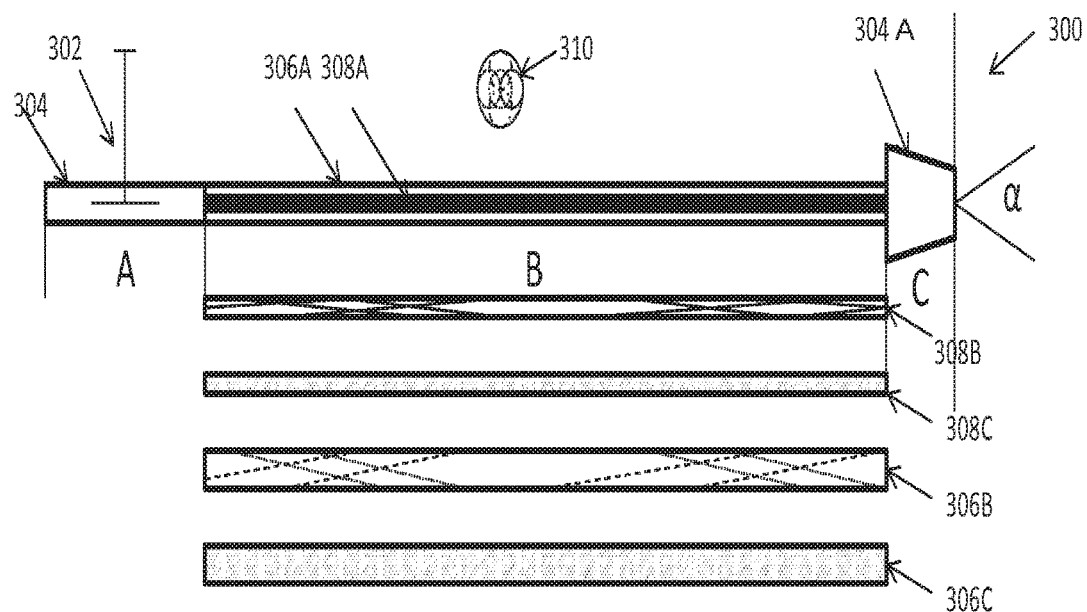
FIG. 3 is a diagrammatic view of a single stage pre-nozzle fuel treatment device of the present invention.

FIG. 3 shows a single stage pre-nozzle device 300 with stages A, B, and C. Stage A shows a first fuel passage 304 with a device pressure regulator 302. Pressure setting of the device pressure regulator 302 could vary between 0-200 PSI depending upon application need and calibration requirements. Stage B is a second fuel passage 306A with an internal treatment rod 308A. Rod 308A is a smooth surface rod. In alternative embodiments of rod 308A, a rod with a spiral track in either clockwise or counterclockwise directions as shown in 308B and a rod with rough textured surface as shown in 308C are possible. The second fuel passage 306A has a smooth interior surface. However, it may also contain an interior spiral track as that of 308B in either clockwise or counterclockwise directions or with an interior textured surface as that of 308C.

Rod 308A is situated inside the second fuel passage 306A free of any supports. If a cross-sectional view is taken, the arrangement between 308A and 306A could look like 310, whereby rod 308A, 306B or 308C could be in the center, leaning against any interior side surface of the second fuel passage 306A.

Alternatively, fuel line 306B with interior tracks spiraling in either clockwise or counter-clockwise directions may be used as shown in dash-lines. Also, fuel passage 306C with a rough interior surface graded in a range from 10 to 12000 grids of roughness, inclusive each and every number in the range, may be used.

Stage C is a nozzle 304. Nozzle 304 has a spray coverage angle α ranging anywhere between 5° to 175°, inclusive of each and every number in the range. Atomized spray pattern can cover the entire interior volume of the spray coverage angle α, partial interior volume of the spray coverage angle α, or leave the innermost interior volume of the spray coverage angle α void.

FIGS. 4 and 6 show the basic configurations of FIG. 2, deviating there-from in that FIG. 4 shows a heating chamber 440 directly heating any fuel in the fuel passage of stage. FIG. 6 shows a heating chamber 640 indirectly heating any fuel in the fuel passage of stage B.

Similarly, FIGS. 5 and 7 show the basic configurations of FIG. 3, deviating there-from in that FIG. 5 shows a heating chamber 540 directly heating any fuel in the fuel passage of stage C, and FIG. 7 shows a heating chamber 740 indirectly heating any fuel in the fuel passage of stage C.

Direct heating of the fuel in the fuel passage means the fuel in fuel passage is directly placed in the chamber of a heat source, such as within furnace 104 whereas indirect heating of the fuel in the fuel passage means a medium heated in the chamber of a heat source such as within furnace 104 is in communication with the pre-nozzle device to heat the fuel residing therein. Direct heating is more efficient and can achieve a desired result quickly. However, it is very important the temperature of the chamber of the heat source be kept to a safe level to prevent accidental ignition of the fuel. On the other hand, indirect heating is quite safe but it takes longer to heat the fuel to a desired temperature.

Figure 8A:
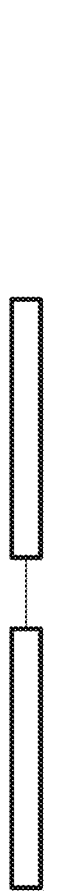
FIG. 8A is a diagrammatic view of any combination of the devices of FIGS. 2-7 connected in series in dual stages.
Figure 8B:
FIG. 8B is a block diagrammatic view of any combination of the devices of FIGS. 2-7 connected in series in multiple stages.
Figure 8C:
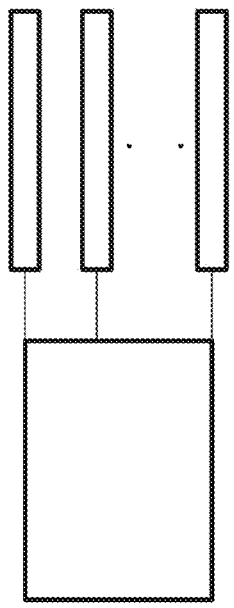
FIG. 8C is a block diagrammatic view of any combination of the devices of FIGS. 2-7 connected in parallel in dual or multiple stages.
Figure 8D:
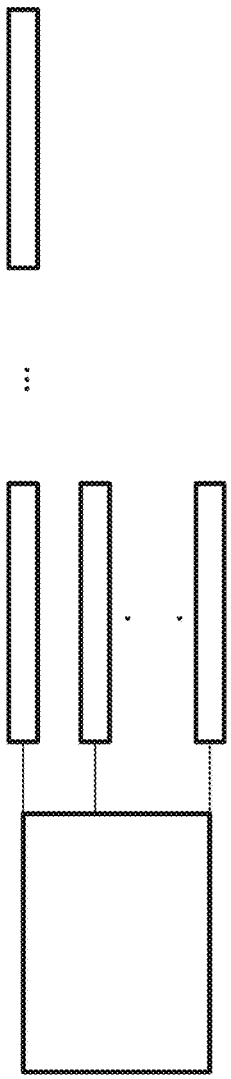
FIG. 8D is a block diagrammatic view of any combination of the devices of FIGS. 2-7 connected in both series and parallel in dual or multiple stages.

FIGS. 8A, 8B, 8C and 8D show multiple connections of any combination of pre-nozzle devices of FIGS. 2, 3, 4, 5, 6 and 7. FIG. 8A shows two pre-nozzle devices connected in series in dual stages. FIG. 8B shows multiple pre-nozzle devices connected in series in multiple stages. FIG. 8C should multiple pre-nozzle devices connected in parallel in multiple stages. FIG. 8D shows multiple pre-nozzle devices connected in a combination of parallel and series in multiple stages.

FIG. 11 shows a table comparing efficiency performance of conventional technology with the present invention. Many experiments were performed; this table shows results of four of them for illustrative purposes. Test A shows the result of the present invention using light heating oil known in the trade as No. 2 diesel. Test B shows the result of conventional technology using the same light heating oil. Because both tests were run at the same facility with same consideration factors such as the indoor square footage, same ceiling height, same room layouts, same weather insulation, etc. Much effort is placed on rendering a fair and accurate comparison between the present invention and the conventional technology. The first noteworthy observation between tests A, B, C and D is that the carbon monoxide level of the present invention as measured at the fluke is zero parts per million. This is extremely significant as carbon monoxide is one of six common air pollutants identified by the United States Environmental Protection Agency (USEPA). Even since the passage of the Clean Air Act, USEPA regulates carbon monoxide emission by developing human health-based and/or environmentally-based criteria for setting permissible levels. Given the present invention renders a zero parts per million result as measured at a fluke, the present invention achieves and sets a gold standard for the industry. Comparing to a conventional equipment as shown in test B, it emits a 51 parts per million. It is widely known that natural gas burns much cleaner than heating fuel. As shown in tests C and D, the carbon monoxide levels are 10 parts per million and 3 parts per million, respectively. Therefore, the present invention provides such as complete combustion of heating fuel that it emits even less carbon monoxide than natural gas.

Regarding undiluted carbon monoxide of the present invention as measured at the fluke, the result is the same; namely, zero parts per million. As compared with the conventional equipment and natural gas furnaces, the contrast is even more drastic; namely, 104, 27 and 10 parts per million, respectively.

The presence of carbon monoxide in tests B, C and D is not due to a lack of oxygen being introduced to the combustion process. In fact, the amount of excess air in tests B, C, and D each individually far exceeds that of test A. The less parts per million of carbon monoxide simply means the combustion is thorough and clean.

The high level of carbon dioxide in test A corroborates the perfect carbon monoxide emission result of the present invention. As shown, test A emits more carbon dioxide than tests B, C and D; namely, 9.6%, 7.6%, 4.3% and 4.1%, respectively. The higher emission of carbon dioxide in test A as compared to tests B, C, and D means precisely that the present invention fully produced a chemical reaction of combining carbon with oxygen to release thermal energy from the heating fuel.

The last two pieces of considerations that bring all data in full agreement are the net efficiency and gross efficiency. Test A has the highest net efficiency and gross efficiency as compared to tests B, C and D. The present invention in test A yields an 11% better net efficiency than conventional equipment in test B. Moreover, the present invention in test A yields 3-4% better gross efficiency than natural gas furnace in tests C and D. A heating oil furnace producing better efficiency than natural gas furnace is simply unheard of.

The present invention indeed materially enhances the quality of the environment of mankind by contributing to the restoration or maintenance of the basic life-sustaining natural elements, as described in 37 CFR 1.102.

The present invention would be recognized as the gold standard of furnaces combustion technology producing the lowest amount of carbon monoxide possible. It is indeed groundbreaking for the industry to have a heating oil furnace to combust more cleanly than a natural gas furnace. The emission level of the present invention is at a level that simply cannot be surpassed.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

The invention claimed is:
1. A multi-stage treatment device of a fluid, comprising:
a pressure regulator;
a first treatment chamber with a first treatment rod fitted therein;
a second treatment chamber with a second treatment rod fitted therein;
a nozzle; and
a solenoid valve installed on one of the first and second treatment chambers selectively set to one of opening and closing to control fluid communications passing there-through;
wherein the pressure regulator, the first treatment chamber, the second treatment chamber, and the nozzle are connected respectively forming a communicable passage allowing the fluid to pass there-through.

2. The multi-stage treatment device of claim 1, wherein an interior volume of the first treatment chamber is larger than an interior volume of the second treatment chamber.

3. The multi-stage treatment device of claim 1, wherein a diameter of the first treatment rod is larger than a diameter of the second treatment rod.

4. The multi-stage treatment device of claim 1, wherein one of the first treatment chamber and the second treatment chamber has a smooth interior surface.

5. The multi-stage treatment device of claim 1, wherein one of the first treatment chamber and the second treatment chamber has an interior track spiraling in one of a clockwise direction, a counter-clockwise direction and a combination of clockwise and counterclockwise directions.

6. The multi-stage treatment device of claim 1, wherein one of the first treatment chamber and the second treatment chamber has an interior rough surface graded in a range from 10 to 12000 grid in roughness inclusive of each and every number within the range.

7. The multi-stage treatment device of claim 1, wherein the pressure regulator has a pressure range between 0 and 200 PSI inclusive of each and every numerical number within the range.

8. The multi-stage treatment device of claim 1, further comprising a set of magnets surrounding one of the first and second treatment chambers.

9. The multi-stage treatment device of claim 8, wherein the set of magnets are set in a repulsive mode in one of south-south and north-north orientations.

10. The multi-stage treatment device of claim 1, further comprising a set of electromagnets surrounding one of the first and second treatment chambers wherein the set of electromagnets is connected to a power source set in a repulsive mode in one of south-south and north-north orientations.

11. The multi-stage treatment device of claim 1, further comprising:
   a heat exchange device with a heat exchange medium, and a heat source;
   wherein the heat exchange medium transfers heat from the heat source to one of the first and second treatment chambers.

12. The multi-stage treatment device of claim 1, further comprising:
   a heat source; and
   an enclosure;
   wherein a portion of one of the first and second treatment chambers is housed within the enclosure of the heat source to transfer heat from the heat source to said portion.

13. The multi-stage treatment device of claim 1, further comprising a pair of solenoid valves whereby one valve is installed on one end of the first treatment chamber and another valve is instated on one end of the second treatment chamber, wherein the pair of valves is selectively set to one of opening and closing to control fluid communication passing there-through.

14. A multi-stage treatment apparatus of a fluid, comprising:
   a plurality of pressure regulators;
   a plurality of first treatment chambers each with a first treatment rod fitted therein;
   a plurality of second treatment chambers each with a second treatment rod fitted therein;
   a plurality of nozzles; and
   a fluid supply chamber;
   a plurality of multi-stage treatment devices each made by connecting one of the plurality of pressure regulators, one of the plurality of first treatment chambers, one of the plurality of second treatment chambers, and one of the plurality of nozzles together respectively forming a passage for the fluid to pass there-through;
   wherein each of the plurality of treatment devices is communicably connected to the fluid supply chamber forming the multi-stage treatment apparatus.

15. The multi-stage treatment device of claim 14, wherein an interior volume of each of the plurality of first treatment chambers is larger than an interior volume of each of the plurality of second treatment chambers.

16. The multi-stage treatment device of claim 14, wherein a diameter of each of the plurality of first treatment rods is larger than a diameter of each of the plurality of second treatment rods.

17. The multi-stage treatment device of claim 14, wherein the plurality of pressure regulator each has a pressure range between 0 and 200 PSI inclusive of each and every numerical number within the range.

18. The multi-stage treatment device of claim 14, further comprising a set of electromagnets surrounding one of the first and second treatment chambers wherein the set of electromagnets is connected to a power source set in a repulsive mode in one of south-south and north-north orientations.

19. The multi-stage treatment device of claim 14, further comprising:
   an enclosure; and
   a heat source;
   wherein a portion of one of the plurality of first and the plurality of second treatment chambers is housed within the enclosure of the heat source to transfer heat from the heat source to said portion.

20. The multi-stage treatment device of claim 14, further comprising a pair of solenoid valves whereby one valve is installed on one end of one of the plurality of first treatment chambers and another valve is instated on one end of one of the plurality of second treatment chambers, wherein the pair of valves is selectively set to one of opening and closing to control fluid communication passing there-through.

* * * * *